Nov. 22, 1927.
W. GOLDSTEIN
MOTION PICTURE SCREEN
Filed June 17, 1925 — 2 Sheets-Sheet 1
1,650,341
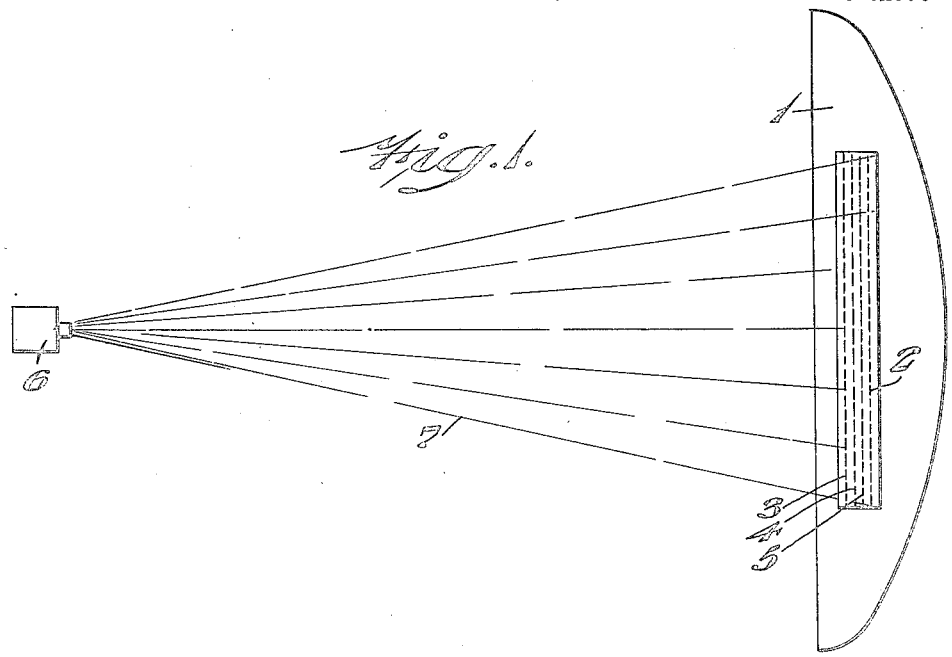
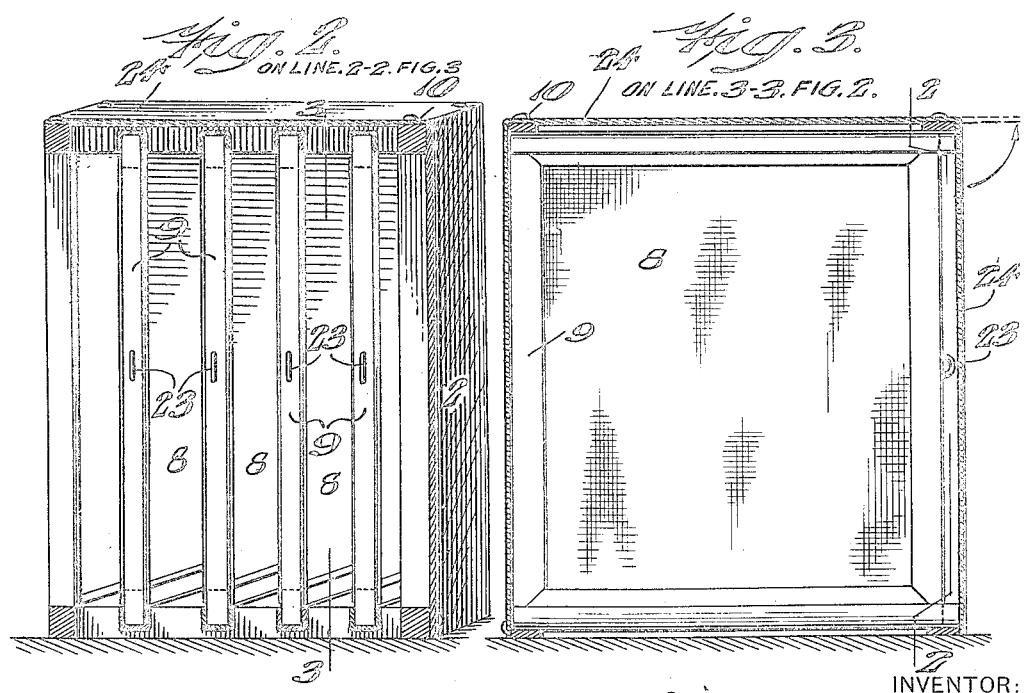

Nov. 22, 1927. 1,650,341
W. GOLDSTEIN
MOTION PICTURE SCREEN
Filed June 17, 1925 2 Sheets-Sheet 2
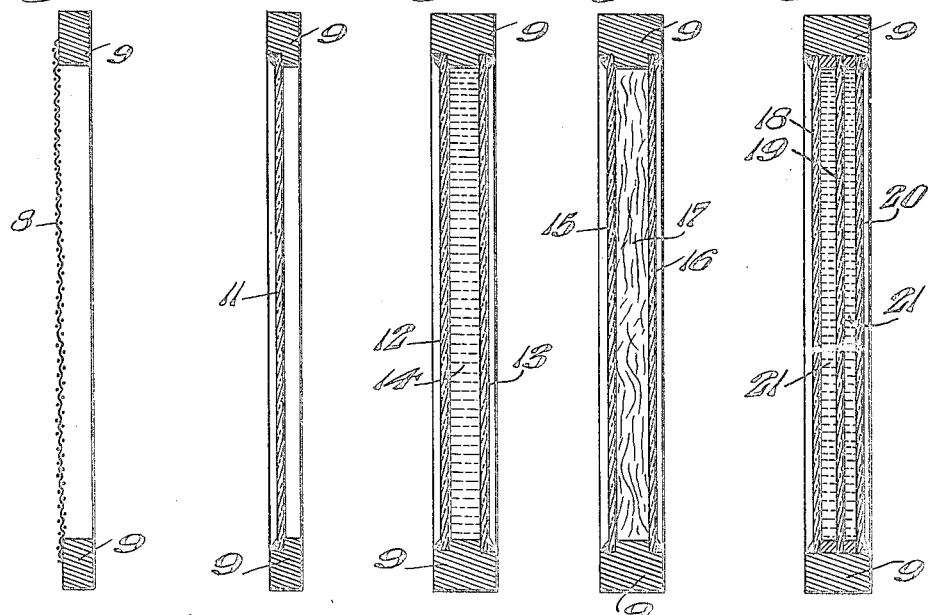
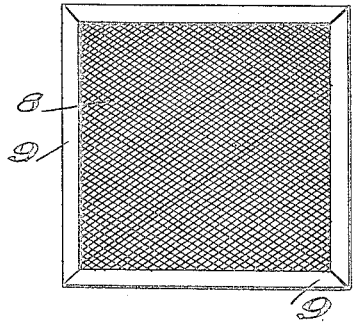
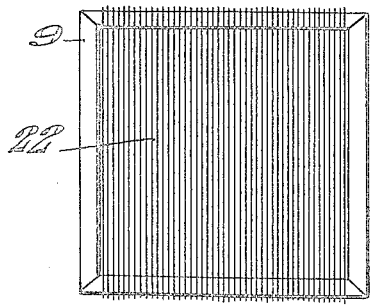
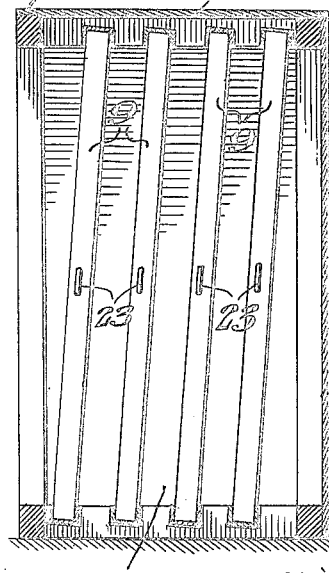
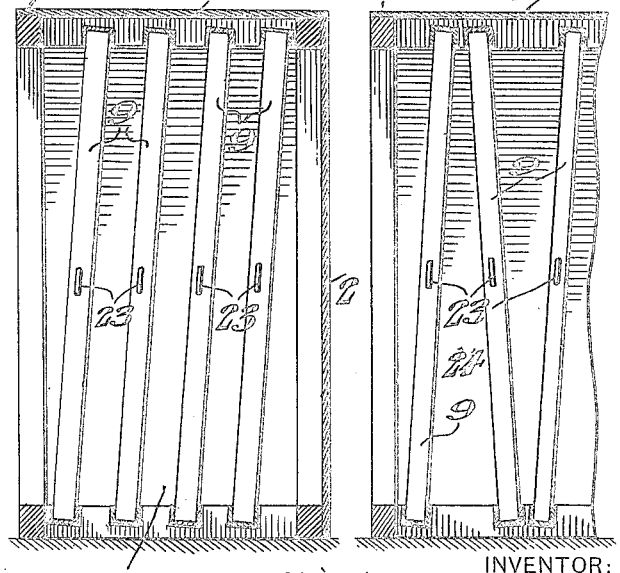
INVENTOR:
William Goldstein.
BY
ATTORNEYS.

Patented Nov. 22, 1927.

1,650,341

UNITED STATES PATENT OFFICE.

WILLIAM GOLDSTEIN, OF PHILADELPHIA, PENNSYLVANIA.

MOTION-PICTURE SCREEN.

Application filed June 17, 1925. Serial No. 37,615.

This invention, generally stated, relates to motion picture apparatus and has more especial relation to screen apparatus as positioned in front of a stage of a motion picture theatre.

The leading object of the present invention is to provide novel apparatus for the screen or curtain of a conventional motion picture theatre screen, which novel apparatus is provided with one or more partly transparent, semi-transparent or other screens or curtains to be used in parallelism in the same plane with the conventional screen or curtain or which may be used at an inclination to each other or to the conventional screen.

A further object of the present invention is to provide a novel construction, arrangement and combination of parts whereby when placed in the association recited in the above principal object will provide for a more efficient showing of the picture projected.

Other and further objects not at this time more particularly recited will be hereinafter more specifically referred to.

The invention consists of the novel constructions hereinafter described and finally claimed.

The nature, characteristic features and scope of the invention will be more fully understood from the following description taken in connection with the accompanying drawings forming part hereof, and in which:

Fig. 1, is a diagrammatic view illustrating the stage of a motion picture theatre equipped with a conventional screen or curtain and having positioned therebefore screens or curtains embodying the present invention.

Fig. 2, is a view in section taken upon the line 2—2 of Fig. 3.

Fig. 3, is a view in section taken upon the line 3—3 of Fig 2.

Fig. 4, is a detached view in central section of one type of screen embodying the present invention.

Fig. 5, is a similar view of an alternative form of screen.

Fig. 6, is a similar view illustrating a further form of screen.

Fig. 7, is a similar view of a still further form of screen.

Fig. 8, is a similar view of still another form of screen.

Fig. 9, is a face view of Fig. 4.

Fig. 10, is a face view of a slightly modified form of that shown in Fig. 4.

Fig. 11, is a view in longitudinal section of a plurality of screens embodying the present invention arranged at an inclination to the conventional motion picture screen; and Fig. 12, is a fragmentary view in longitudinal section illustrating screens embodying the present invention shown at an inclination to each other as well as at an inclination to a conventional motion picture screen.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail and with especial reference to Fig. 1, the reference numeral 1 designates the stage of a motion picture theatre. The dashed lines 2 designate a conventional solid or opaque motion picture screen or curtain and reference numerals 3, 4, and 5 designate a selected group of auxiliary screens as embodied by the present invention. The numeral 6 designates a motion picture projection device and the dashed lines 7 designate the light rays of the image as projected from said apparatus 6 to the conventional screen 2 through auxiliary screens 3, 4, and 5. As present practiced images as projected from a motion picture projecting machine are displayed upon a conventional screen 2 which is of an opaque or solid structure and the projection thrown upon said screen is of but two dimensions, to wit: height or length and breadth. According to the present invention, pictures projected from an apparatus as 6 have in addition to the dimensions height or length and breadth, thickness or depth, or in other words have three dimensions in contradistinction from two dimensions. I accomplish this result by placing before a conventional screen 2 one or more auxiliary screens which may be partly transparent or semi-transparent and preferably are of the same size as the screen 2 and arranged in the same vertical plane therewith, although I may if desired arrange auxiliary screens both at an inclination to each other and at an inclination to the conventional screen 2. These auxiliary screens or curtains may be made of various materials. As shown in Fig. 4 the screen 8 which is carried by a frame 9 movably inserted in a housing or casing 10 is comprised of suitable material made up of wefts or warps. This material 8 may be mosquito netting, gauze, marquisette, or equivalent material. The threads making up the wefts and warps may be cotton, silk or wool or other vegetable, mineral or metallic threads and the threads may be treated with an appropriate chemical or otherwise treated to absorb or reflect rays of light. The wefts and warps may be vertically and horizontally arranged with respect to frame 9 or may be arranged at an angle thereto as circumstances may dictate. As shown in Fig. 5 instead of the wefts and warps aforesaid, the same may be supplemented by a partly transparent glass panel 11, or if experience dictates, several partly transparent panels of glass. Referring now to Fig. 6, panels of glass 12 and 13 may be spaced apart within frame 9 and between the panels of glass may be introduced water or other liquid 14. The water or liquids may be colored as practice may dictate. Referring to Fig. 7, spaced panels of glass 15 and 16 are provided between which may be introduced a material 17 of any suitable solid or semi-transparent material. In Fig. 8 I have disclosed glass panels 18, 19, and 20 and between panels 18 and 19 and between panels 19 and 20 I have introduced a liquid material 21. Fig. 9 illustrates the gauze effect shown in Fig. 4 but arranged at an angle to the frame; and in Fig. 10 I have illustrated in lieu of gauze 8 a plurality of vertically disposed parallel threads 22 closely positioned with respect to one another. As shown in Fig. 2 the frames 9 are arranged in parallelism with conventional screen 2 but in Fig. 11 the frames 9 are arranged at an inclination to screen 2 but the frames 9 are arranged in parallelism with one another. In Fig. 12 the frames 9 are not only arranged at an inclination to conventional screen 2 but are arranged at an inclination to one another. In practice the various frames 9 are preferably removably positioned within a casing 10 so that any one or more frames 9 may be removed as practice may dictate. The casing 10 is provided with a closed bottom and closed sides and top so that rays of light may thus pass from end to end of the casing through the various screens above referred to, any number of which may be employed as practice dictates.

With the motion picture projection machine 6 in operation, rays of light or the image projected is relayed to the partly transparent or semi-transparent screens or curtains as above described before the same reach the conventional solid or opaque curtain 2. Thus the rays of light are in accordance with the particular screen arranged before the conventional screen portrayed upon the conventional screen in such manner as to provide the optical effect of being of a thickness or depth corresponding with the natural depth to be expected in the natural object being portrayed.

It will be understood that in accordance with the broad principles of my invention, I may employ either a single screen or a plurality of screens of the character seen in Figs. 4 to 12, and the series of one or more screens or curtains may be placed either close together or far apart with respect to each other, and may be positioned at any desired point in front of the conventional or opaque solid screen or curtain 2, which latter may be of any solid or opaque material or substance, and it will be apparent that the rear solid or opaque screen 2, and the front removable or adjustable semi-transparent curtains of the character seen in Figs. 4 to 12 may or may not have their four edges or sides or outer periphery surrounded by any dark or black material to confine the light to the solid curtain 2 and the semi-transparent screens or curtains of the character seen in Figs. 4 to 12.

The screen frames 9, may be provided with handles 23 to facilitate their withdrawal from the casing 10, and it will be obvious that said frames may be withdrawn from said casing either horizontally or vertically, said frames being slidable in guide grooves or ways of any suitable character, which it is unnecessary to describe in detail.

My novel device can be readily installed in proximity to any of the standard or conventional opaque screens 2, by any suitable means without necessitating the employment of skilled labor, and it will be understood that the screens 3, 4 and 5 seen diagrammatically in Fig. 1 may be taken as any one of the screens, seen in Figs. 4 to 12.

It will further be apparent that the frames 9 seen in Figs. 2 and 3 may be taken as the frames of any one of the modifications seen in Figs. 4 to 10 and that if desired the frames 9 portrayed in said Fig. 2 may all of them carry the partly transparent or semi-transparent curtain members seen in any one of Figs. 4 to 10. For example in Fig. 2 I have shown four frames 9 as being employed and said four frames may if desired carry any one of the partly transparent or semi-transparent curtains or media seen in any one of the Figs. 4 to 10 or I may if desired combine a plurality of the semi-transparent media seen in any one of said Figs. 4 to 10, and in practical use of my invention I do not desire to be limited to any particular form or species of the partly transparent or semi-transparent media seen in any of said Figs. 4 to 10.

In the construction seen in Figs. 2 and 11, it will be understood that the right hand screen or curtain 2 is the conventional opaque rear screen or curtain, commonly employed and positioned as also seen in Fig. 1 and that I may if desired as seen in Fig. 2 collocate in a single casing, said opaque rear screen 2, and arrange in the front thereof, a single screen or a plurality of partly transparent or semi-transparent screens of the character already described with respect to Figs. 4 to 10, any one or more of the frames 9 carrying said screens being removable according to requirements.

It will be understood that the casing 10 is covered with suitable opaque material as indicated at 24 in Figs. 2, 3, 10 and 11.

It will now be apparent that I have devised a novel and useful motion picture screen which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the character stated, the combination of a rear opaque screen, a plurality of front partly transparent screens positioned at an angle to and in front of said rear opaque screen, and a casing forming a common support for all said screens whereby the projected image will be given the dimension of thickness in addition to the dimensions of height and breadth.

2. In a device of the character stated, a rear opaque screen, a casing for said rear opaque screen, and a semi-transparent screen slidably mounted in said casing, and a plurality of guiding means in said casing for positioning said latter screen at any desired distance and at a desired angle in front of said opaque screen.

3. In a device of the character stated, a casing, a rear stationary opaque screen supported thereupon, a plurality of semi-transparent screens, frames to which said latter screens are secured, and transverse guide grooves out of vertical alignment in said casing for supporting and guiding said frames, so that the latter may stand at an angle to said opaque screen.

WILLIAM GOLDSTEIN.